(12) United States Patent
Watson

(10) Patent No.: US 6,973,936 B2
(45) Date of Patent: Dec. 13, 2005

(54) FLUID INJECTION SYSTEM

(76) Inventor: Richard R. Watson, 2015 Glenn Lakes La., Missouri City, TX (US) 77459

( * ) Notice: Subject to any disclaimer, the term of this patent is extended or adjusted under 35 U.S.C. 154(b) by 226 days.

(21) Appl. No.: 10/725,815

(22) Filed: Dec. 2, 2003

(65) Prior Publication Data

US 2005/0115712 A1    Jun. 2, 2005

(51) Int. Cl.$^7$ .................. G05D 7/06; F16K 11/065; E21B 37/06; G01F 3/16
(52) U.S. Cl. .................. 137/1; 137/486; 137/487.5; 137/624.12; 137/554; 137/625.18; 166/310; 73/249
(58) Field of Search ................ 73/239, 249; 137/486, 137/487.5, 554, 624.12, 625.18; 166/53, 166/310, 902

(56) References Cited

U.S. PATENT DOCUMENTS

| | | | |
|---|---|---|---|
| 2,772,664 A * | 12/1956 | Jones et al. | ................. 73/239 |
| 3,211,225 A * | 10/1965 | Thiessen et al. | ........... 166/90.1 |
| 3,768,510 A * | 10/1973 | Reves | ........................ 137/551 |
| 4,375,833 A * | 3/1983 | Meadows | .................... 166/64 |
| 4,512,187 A | 4/1985 | Sigwardt | |
| 4,512,188 A | 4/1985 | Erickson | |
| 6,745,838 B2 * | 6/2004 | Watson | ....................... 166/310 |
| 6,851,444 B1 * | 2/2005 | Kohl et al. | .................... 137/13 |

* cited by examiner

*Primary Examiner*—Ramesh Krishnamurthy
(74) *Attorney, Agent, or Firm*—Browning Bushman P.C.

(57) ABSTRACT

A fluid injection system controls the distribution of fluid from a supply line to a selected well at an adjustable rate. A fluid barrier divides a cylinder into first and second chambers. A multi-position valve comprises a first position for passing fluid from the supply line into the first chamber to displace fluid from the second chamber back through the valve to an injection point, and a second position for passing fluid from the supply line to the second chamber to displace fluid from the first chamber back through the valve to the injection point. A control system in communication with a position sensor times displacement of the fluid barrier to selected positions, and selectively adjusts a variable valve opening to adjust flow rate, switch between the first and second positions, and periodically increase the valve opening for cleaning.

32 Claims, 6 Drawing Sheets

FLUID INJECTION SYSTEM

FIELD OF THE INVENTION

This invention relates to a fluid injection system for controlling the distribution of fluid from a supply line to a selected well at an adjustable rate. More particularly, the present invention relates to systems and methods for controlling injection rates over a wide flow range, while preventing problems associated with the use of small flow orifices.

BACKGROUND OF THE INVENTION

The efficient production of oil and gas from subsea wells requires the injection of various treatment chemicals to maintain the desired composition of well fluid by controlling variables such as corrosion, scale, paraffin, emulsion, and hydrates. Often, several wells are located near each other within a producing field, but at significant distance from a surface pumping station from which chemicals are pumped. In many instances wells are offset from the pumping station by more than 10 miles, and at depths of more than 900 feet. Reliable methods and systems are therefore required to distribute chemicals to each well.

Existing chemical injection control systems are typically based on a pressure compensated flow device using a pressure regulating valve in combination with an orifice to regulate the chemical flow at each well. Flow through a capillary orifice is often adjusted using a tapered metering screw to adjust an orifice diameter. A major disadvantage of this type of system stems from the small orifice size required. Chemicals are typically needed only in small quantities, but they must be delivered at high pressure to ensure flow to every well over long distances. To deliver a chemical at several thousand psi at the rate of only a few gallons per day requires a very small orifice. An orifice this small is easily clogged by contaminants. Some prior art includes flow filters to prevent clogging, but providing and servicing these filters, especially in subsea environments, is expensive.

U.S. Pat. No. 4,512,187 discloses an example of a chemical injection system. Two displacement chambers are provided and connected by a control conduit. Damping fluid is contained between first and second movable barriers in the first and second chambers respectively. The damping fluid can pass between the first and second chambers via the control conduit. A pressure and control valve is included in the control conduit for controlling flow of the damping fluid. Chemical fluid to be delivered to a well enters one end of the first displacement chamber opposite the first movable barrier from the damping fluid. This moves the first movable barrier to displace the damping fluid to the second chamber, which in turn moves the second movable barrier to dispense the chemical fluid opposite the second movable barrier from the damping fluid. The flow of chemical fluid to and from the chambers is selectively reversed, to provide continuous flow of chemical fluid.

U.S. Pat. No. 4,512,188 discloses another example of a chemical injection system intended to reduce shear forces on the chemical fluid to be delivered. Each of first and second piston and cylinder assemblies has a first port on one side of the piston and a second port on the other side. A secondary fluid path between the two second ports contains a damping fluid directed through a pressure reducing valve. The rate of flow of the primary fluid from the discharge cylinder is controlled by the rate of flow of the damping fluid through the pressure reducing valve. A four way valve couples the chemical fluid at relatively high pressure through the first port in a first cylinder, and the controlled liquid is discharged at relatively low pressure from the first port in the second cylinder.

The systems disclosed in the '187 and '188 patents are similar in that they are designed specifically for shear-sensitive fluids and thus require passing a separate damping fluid through a control valve. An associated disadvantage of this type of system is thus the need for a separate damping fluid, along with increased parts, such as two separate cylinders each housing separate fluid barriers. A system with two cylinders and fluid barriers is inherently more prone to failure than a system with fewer parts. Another disadvantage is the risk of mixing the damping fluid with and contaminating the chemical fluid to be delivered.

Another complication of existing systems in general is that using a small orifice increases the need to verify flow rate data provided by flow control devices. A separate feedback device is commonly used at the well for this purpose. These devices operate over a narrow range and are therefore limited in application. This further increases the cost of chemical injection systems.

SUMMARY OF THE INVENTION

A fluid injection system controls the distribution of fluid from a supply line to a selected well at an adjustable rate. A metering body has a bore for containing fluid, and a fluid barrier segregates the bore into variable-volume first and second chambers. The fluid barrier is movable in response to a pressure difference between the first and second chambers. A first input-output port passes fluid into and out of the first chamber, and a second input-output port passes fluid into and out of the second chamber. A multi-position valve comprises a first position for passing fluid from the supply line into the first chamber, thereby moving the fluid barrier to displace fluid from the second chamber back through the valve to an injection point, and a second position for passing fluid from the supply line to the second chamber, thereby moving the fluid barrier to displace fluid from the first chamber back through the valve to the injection point. The valve further comprises a variable valve opening for controlling flow between the supply line and the metering body. A position sensor senses position of the fluid barrier within the metering body. A control system is in communication with the position sensor and includes a timer for timing displacement of the fluid barrier to selected positions. The controller may compute an actual flow rate as a function of the signal from the timer and the known volume of fluid, and compares the actual flow rate to a desired flow rate. The selected positions of the fluid barrier may include one or both of opposing ends of the metering body.

The control system selectively adjusts the variable valve opening in response to displacement time of the fluid barrier and selectively reverses the position of the multi-position valve in response to position of the fluid barrier. The controller also selectively increases the valve opening to a substantially fully open position, for increasing fluid flow through the valve opening to clean the valve. The controller may open the valve opening to clean the valve as a function of a preselected number of displacement cycles. A valve pressure sensor may be included for sensing a reduced flow rate through the valve opening, in response to which the controller opens the valve opening to clean the valve. The controller may also open the valve opening for cleaning in response to increasing time intervals corresponding to a decreasing flow rate.

The controller may decrease the valve opening temporarily to reduce the flow rate, to compensate for an increased flow rate during cleaning. Alternatively, the controller may selectively pause prior to reversing the position of the multi-position valve, to decrease the average flow rate from the metering body to the injection point.

The metering body and fluid barrier preferably comprise a fluid cylinder and a piston. At least one of a first and second port valve may be included for closing a respective one of the first and second input-output ports in response to movement of the fluid barrier. These first and second port valves may further comprise sealing members on the fluid barrier for seating within the respective input-output ports when the fluid barrier has reached an end of the metering body. In less preferred embodiments, the metering body need not be cylindrical, and may have a non-circular cross-section.

The system preferably comprises a gate valve having a variable position gate for selectively positioning with respect to a flow path. A stepper motor may thus drive a ball screw to selectively position the gate with respect to the flow path.

The position sensor may include a proximity sensor for sensing that the fluid barrier has reached the selected positions. The position sensor may alternatively include a pressure sensor for sensing a pressure reduction in fluid flowing from the metering body corresponding to displacement of the fluid barrier to the full-travel positions.

These and further features and advantages of this invention will become apparent from the following detailed description, wherein reference is made to the figures in the accompanying drawings.

DETAILED DESCRIPTION OF THE PREFERRED EMBODIMENTS

Figure 1:
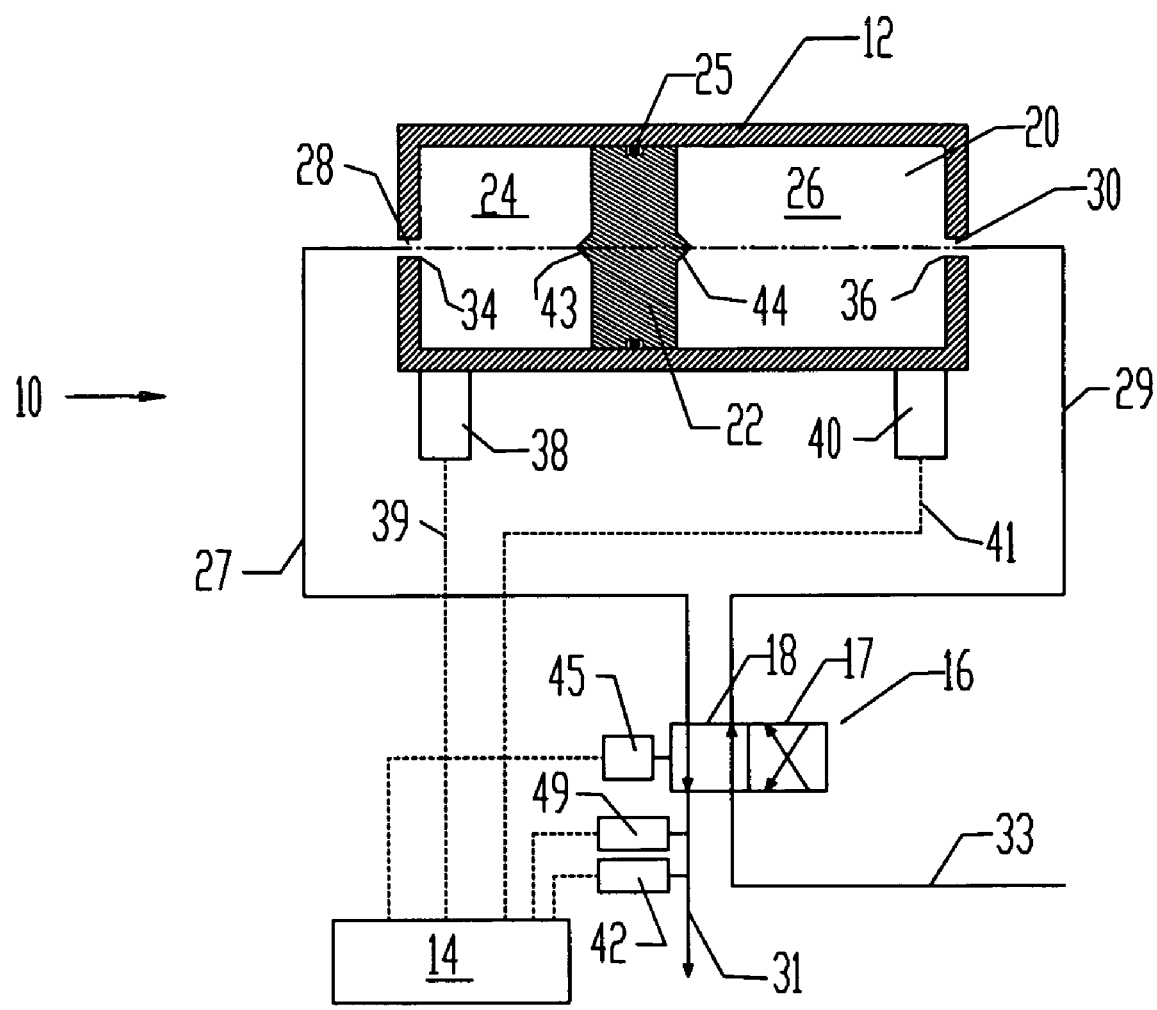
FIG. 1 schematically illustrates details of a metering body connected to a control system in a chemical injection system.

FIG. 1 schematically illustrates details of a metering body 12 interconnected with a control system 14 and a multi-position valve 16 in a chemical injection system 10. The metering body 12 has a bore 20 for containing chemical fluid to be delivered to a well. An axially movable fluid barrier 22 in the bore 20 divides the metering body 12 into variable-volume first and second chambers 24, 26. The fluid barrier 22 seals with the metering body 12 with a sealing member such as O-ring 25. The metering body 12 and the fluid barrier 22 conventionally comprise a cylinder and piston assembly, as shown. First and second input-output ports 28, 30 are provided for passing fluid into and out of first and second chambers 24, 26. Supply line 33 supplies chemical fluids at high pressure through the multi-position valve 16 to the metering body 12.

In a first valve position shown in FIG. 1, illustrated conceptually by alignment of parallel line segments 18 with lines 31 and 33, fluid passes from the supply line 33, through multi-position valve 16, line 29, and input-output port 30, and into the chamber 26. As fluid passes into the chamber 26, fluid pressure urges the fluid barrier 26 toward end 34 of the metering body 12, decreasing the volume of the first chamber 24 and displacing the fluid out through the input-output port 28. Fluid exiting port 28 passes through line 27, back through valve 16, and out through line 31 to an injection point in the well.

In a second position (not shown), illustrated conceptually by sliding the "X" 15 in valve 16 to the left to align with lines 31 and 33, fluid passes from the supply line 33, through multi-position valve 16, line 27, input-output port 28, and into the chamber 24. As fluid passes into the chamber 24, fluid pressure urges the fluid barrier 26 toward end 36 of the metering body 12, decreasing the volume of the chamber 26 and displacing the fluid out through the input-output port 30. Fluid exiting port 30 passes through line 29, back through valve 16, and out through line 31 to the same injection point in the well. Thus, by repeatedly reversing the direction of the multi-function valve 16 after the fluid barrier 22 has reached a selected position, the fluid may be continually passed from line 33 to line 31 to the injection point in the well.

Position sensors 38 and 40 are included for sensing position of the fluid barrier 22. The position sensors 38, 40 are in communication with the control system 14 as represented by dashed lines 39, 41 through conventional means, such as by wire or wireless signal. When the fluid barrier 22 reaches selected positions, the position sensors 38, 40 signal the control system 14, in response to which the control system 14 may selectively reverse the position of the multi-position valve 16 to reverse the direction of the fluid barrier 22.

Because the selected positions are known, relative displacement of the fluid barrier 22 is also known, corresponding to a known volumetric displacement of fluid from the metering body 12, computed as the product of displacement of the fluid barrier 22 and cross-sectional area of the bore 20. The control system 14 includes an internal timer for timing displacement of the fluid barrier 22 between the selected positions, as signaled by the position sensors 38, 40. A volumetric flow rate is therefore also known, which may be computed as the volumetric displacement divided by displacement time. The multi-position valve 16 includes a variable valve opening discussed below in conjunction with FIGS. 3–6, for controlling flow between the supply line 33 and the metering body 12. The control system 14 selectively adjusts the variable valve opening in response to displacement time of the fluid barrier 22. If the displacement time is too long, indicating a flow rate less than a desired flow rate, the control system 14 may increase the variable valve opening to increase the flow rate. Conversely, if the displacement time is too short, indicating a flow rate less than the desired flow rate, the control system 14 may selectively decrease the valve opening to reduce the flow rate. The flow rate of the fluid delivery to the well is thereby controlled.

As shown in FIG. 1, the selected positions of the fluid barrier 22 are preferably the positions of the fluid barrier 22 having reached either end 34, 36 of the metering body 12. The selected positions of the fluid barrier 22 could alternatively be anywhere along the range of travel of the fluid barrier 22, and need not be at the ends 34, 36 of the metering body 12. In typical embodiments, as illustrated, the position sensors 38, 40 are at substantially the same axial position as the selected positions. Conventional position sensors such as spring-loaded pins or magnetic or infrared proximity sensors may be used. In other embodiments, the position sensors conceivably may not need to be axially aligned with the selected positions. A position sensor may further comprise an optional pressure transducer 49 or a flow transducer 42. These types of position sensors may sense position implicitly, such as when there is a sudden drop of pressure in line 31 as the fluid barrier reaches the ends 34, 36 of the metering body 12. Optional port valves such as might comprise sealing members 43, 44 on the fluid barrier 22 may be included for sealing the input-output ports 28, 30 when the fluid barrier reaches the ends 34, 36. This could more dramatically decrease pressure in line 31, to more distinctly indicate the fluid barrier 22 has reached the end of its travel.

The variable opening has an advantage in its ability to regulate flow rate, in contrast to passive or tiny orifice plates with little or no adjustability, as used in some prior art. To restrict high pressure flow, however, the adjustable opening typically needs to be fairly narrow. Over long periods, if the valve opening is so constricted, it will potentially become clogged with contaminants or debris. The adjustable valve opening, and in particular the gate-valve type opening of the preferred embodiment, may periodically be opened more widely to a "cleaning position", to increase fluid flow, sweep away contaminants and debris, and allow them to pass. The cleaning position is preferably a substantially fully-open position, and may be achieved within each of the first and second positions. The cleaning position may include simply opening the valve more widely in the first or second position than is normally desired during chemical injection at a desired flow rate.

This periodic opening of the valve can be effected in a number of different ways. In one embodiment, the control system 14 may follow a cleaning schedule, such as by opening the valve to the cleaning position after a preselected number of cycles. In another embodiment, the control system 14 may detect an unexpected decrease in flow rate indicated by increasing displacement times. Unexpected decreases in flow rate may alternatively be detected by a pressure sensor. For example, the pressure transducer 49 may further detect such unexpected decreases in flow rate, distinguishing them from the sudden, larger drop-offs described above in conjunction with the fluid barrier 22 reaching ends 34, 36.

Opening the valve 16 to the cleaning position may also increase flow temporarily. To counter this temporarily increased flow, the control system may selectively decrease flow temporarily. For example, the controller may decrease the valve opening temporarily to reduce the flow rate, to compensate for an increased flow rate when at the cleaning position. Alternatively, the controller may selectively pause prior to reversing the position of the multi-position valve at the end of a stroke, to decrease the average flow rate from the metering body to the injection point.

Figure 2:
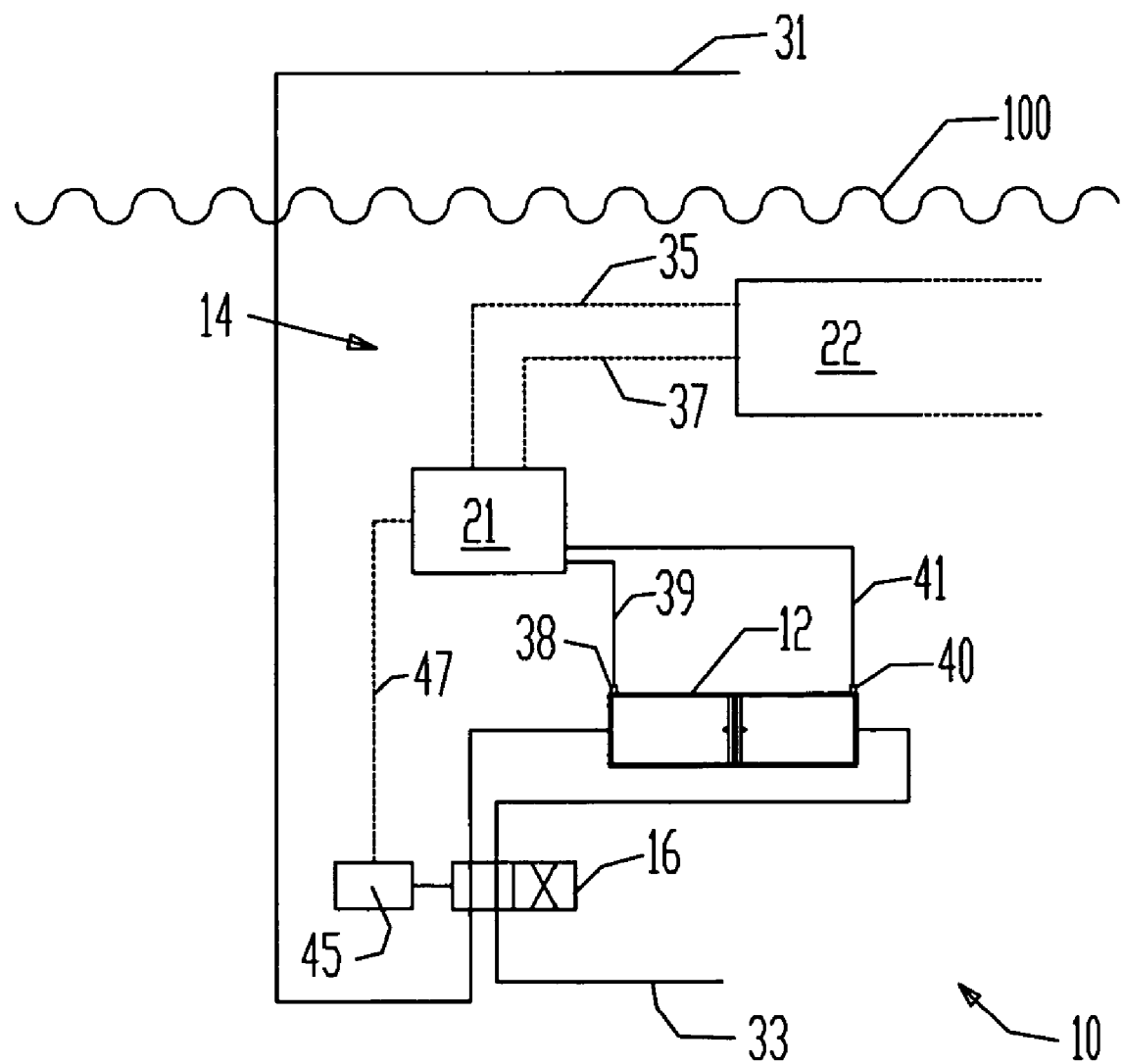
FIG. 2 schematically illustrates details of the control system under water as connected with the metering body and multi-position valve.

FIG. 2 shows further details of an embodiment of the control system indicated generally at 14, shown submerged beneath a water line 100, as connected with the metering body 12 and multi-position valve 16. The control system 14 in this embodiment includes a control module 21 in communication with a client control pod 22 as represented by dashed lines 35, 37, preferably by wire or possibly by wireless signal. The control module 21 is in communication with the position sensors 38 and 40 as described above. The client control pod 22 may be alternately delivered subsea to interface with the rest of the control system 14 and returned to the surface, such as for servicing or reprogramming, while the control module 21 may remain in place with the rest of the chemical injection system 10. Those skilled in the art will appreciate that other embodiments of the control system 14 are possible for control of the fluid injection process. FIG. 2 further shows that the control system 14 is in communication with a valve actuator 45, as represented by line 47, to control the valve 16. The valve actuator 45 may comprise a stepper motor 45 included with a preferred embodiment valve 16 illustrated in various positions in FIGS. 3, 4, and 5.

Figure 3:
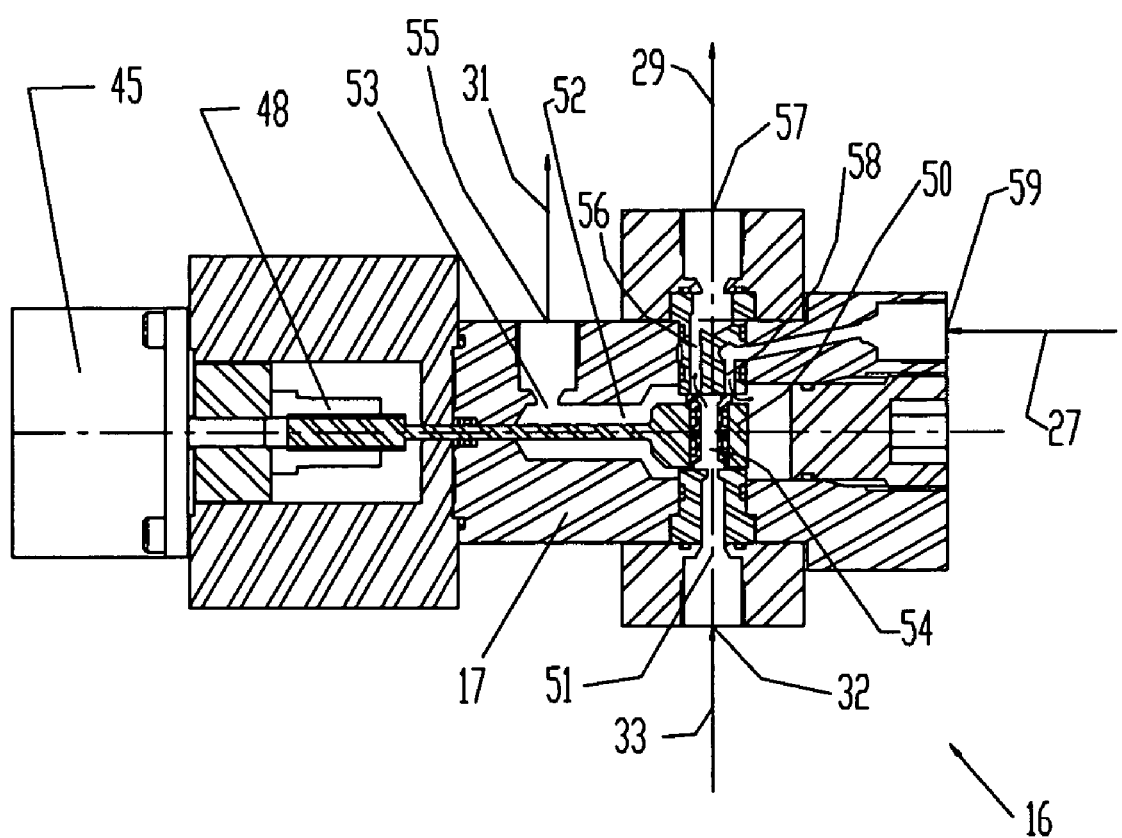
FIG. 3 shows a detailed view of a preferred embodiment of the multi-position valve, partially open, in one of two positions for controlling flow in one direction.
Figure 4:
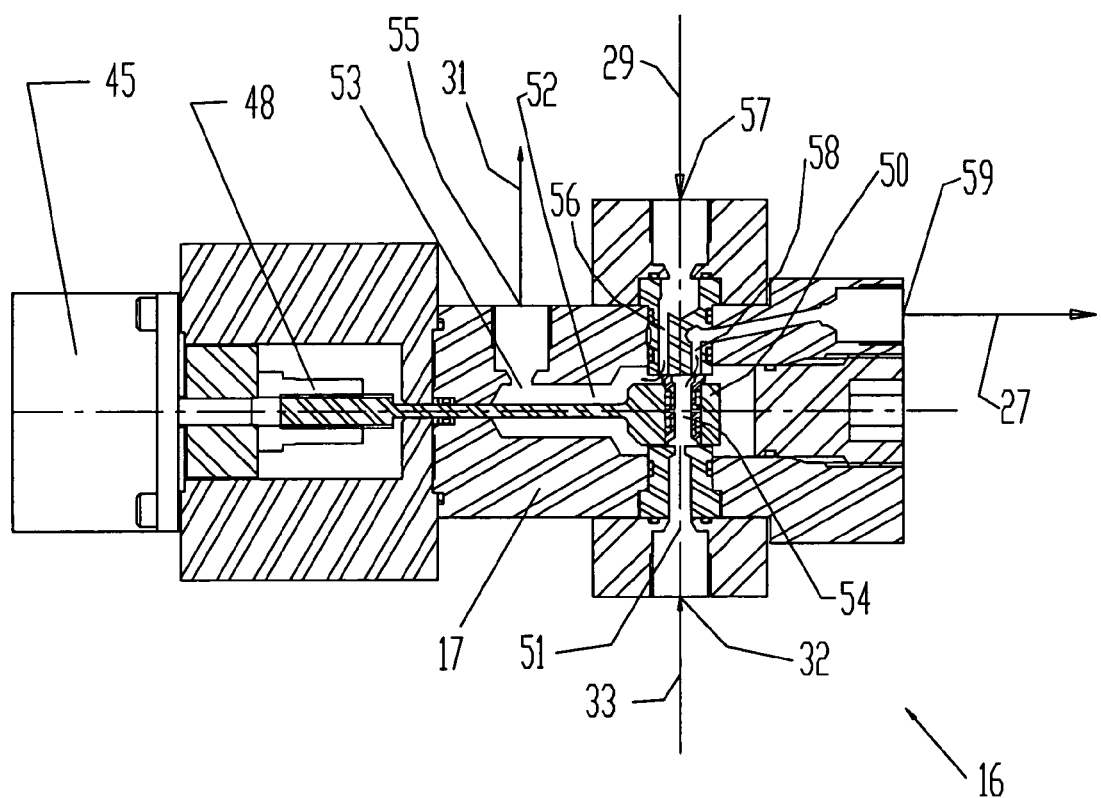
FIG. 4 shows a detailed view of the preferred multi-position valve in the other of two positions, partially open, for controlling flow in another direction.
Figure 5:
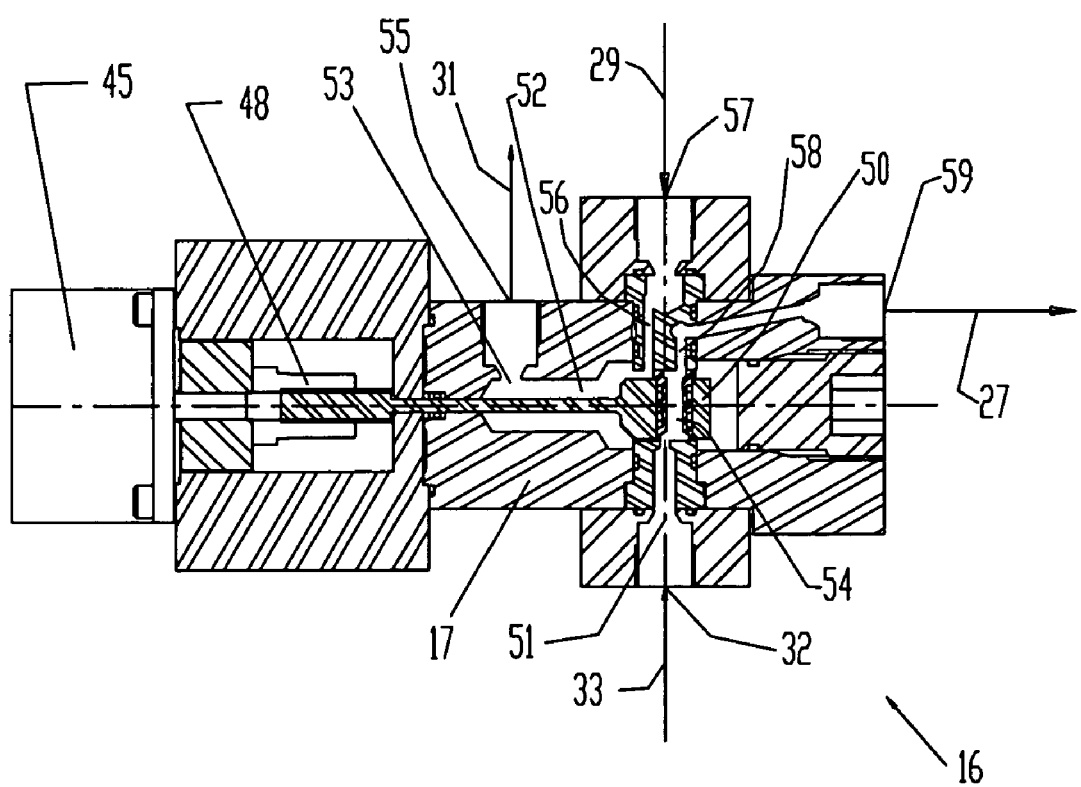
FIG. 5 shows a detailed view of the preferred multi-position valve in the position of FIG. 4, but more widely open.
Figure 6:
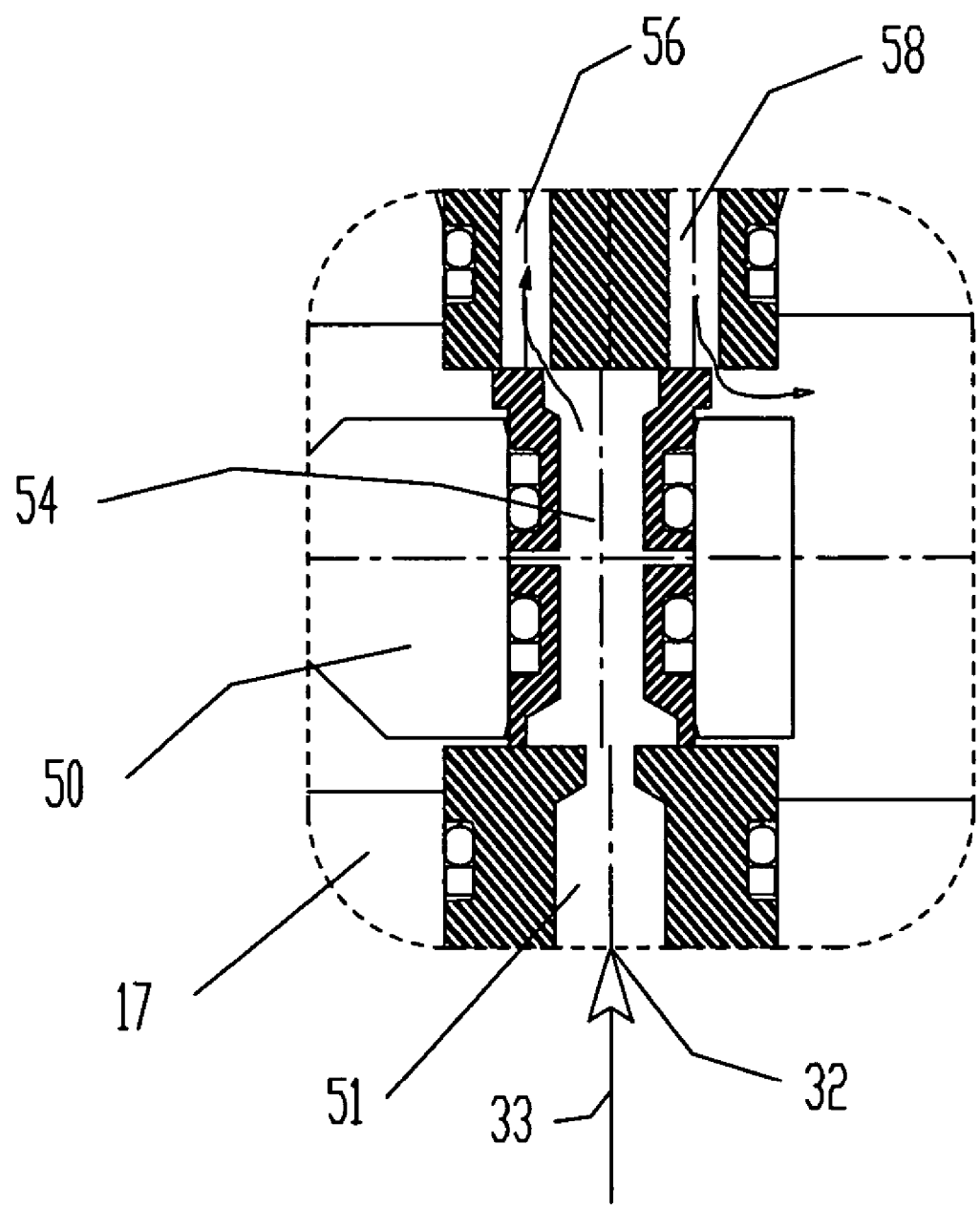
FIG. 6 shows in closer detail a portion of the gate-type valve in the first valve position of FIG. 3.

The terms "first position" and "second position" in connection with the valve 16 refer generally to the resulting direction of flow, rather than a fixed position of components of the valve 16, because there is generally a degree of adjustability in each of the two position, such as to adjust flow rate. FIG. 3 shows a detailed view of the preferred embodiment of the multi-position valve 16 in the first valve position, partially open to limit flow through the valve. FIG. 4 shows a detailed view of the preferred valve 16 in the second valve position, also partially open. FIG. 5 shows the valve 16 in the second valve position of FIG. 4, opened more widely to increase flow rate. FIG. 6 shows in closer detail a portion of the gate-type valve 16 in the first valve position of FIG. 3.

Referring particularly to FIG. 3, the schematic of FIG. 1, and the closer view of FIG. 6, the multi-position valve is indicated generally at 16, having a body 17. A gate 50 is positioned within a cavity 52 in the body 17. The gate 50 has a bore 54, which in the position shown is in communication with an entrance port 32 and with a first flow passage 56 extending through the body 17 to a first exchange port 57. Thus, in this position, chemical fluid supplied by the supply line 33 discussed above flows into the body 17 through entrance port 32, through the gate bore 54, and through the first flow passage 56, exiting through the first exchange port 57 to the line 29. As described above, fluid passes through line 29 into the metering body 12, and other fluid passes from the metering body 12 through line 27 back to the valve 16. Flow then passes back into the body 17 through the second exchange port 59, into a second flow passage 58, passes around the gate 50, into an exit passage 53, and out through an exit port 55. Flow out through exit port 55 finally passes through line 31 to the injection point in the well, as described above.

In FIG. 4, the gate bore 54 is instead positioned in communication with the entrance port 32 and with the second flow passage 58. Thus, flow from line 33 passes through entrance port 32 into entrance passage 51, through the gate bore 54, and through the second flow passage 58, exiting through the second exchange port 59 to the line 27. As described above, fluid passes through line 27 into the metering body 12, and other fluid passes from the metering body 12 through line 29 back to the valve 16. Flow then passes back into the body 17 through the first exchange port 57, into the first flow passage 56, into the exit passage 53, and out through the exit port 55. Flow out through exit port 55 finally passes through line 31 to the injection point in the well. Thus, as described in connection with FIG. 1, flow between the valve 16 and the metering body 12 may be reversed by moving the valve between the first and second valve positions shown in FIG. 3 and FIG. 4, but in each case the net flow is from line 33 to line 31 to the injection point in the well.

In the embodiment shown in FIGS. 3–6, the stepper motor 45 drives a ball screw 48 to axially move the gate 50 within the cavity 52, adjusting the size of the flow path defined between the gate bore 54 and the first flow passage 56, thereby adjusting flow to a desired flow rate. The gate 50 can be moved axially to change between the first valve position of FIG. 3 and the second valve position of FIG. 4.

FIG. 5 shows the valve 16 in the second valve position, but with the gate 50 further axially moved to the cleaning position described above, creating a wider flow path between gate bore 54 and flow passage 58. This maximizes flow through the valve 16, and particularly through the flow path between gate bore 54 and flow passage 58, such as to clean them. Likewise, the gate 50 may be moved to open the flow path to a cleaning position while in the first position, to clean the flow path between gate bore 54 and flow passage 56. Those skilled in the art will recognize alternative, lesser preferred means for moving the gate, other than the step motor 45.

While preferred embodiments of the present invention have been illustrated in detail, modifications and adaptations of the preferred embodiments may occur to those skilled in the art. It is to be expressly understood, however, that such modifications and adaptations are within the scope of the present invention as set forth in the following claims.

What is claimed is:

1. A fluid injection system for controlling the distribution of fluid from a supply line to a selected well at an adjustable rate, comprising:
    a metering body having a bore for containing fluid;
    a fluid barrier segregating the bore into variable-volume first and second chambers, the fluid barrier movable in response to a pressure difference between the first and second chambers;
    a first input-output port for passing fluid into and out of the first chamber, and a second input-output port for passing fluid into and out of the second chamber;
    a multi-position valve comprising a first position for passing fluid from the supply line into the first chamber, thereby moving the fluid barrier to displace fluid from the second chamber back through the valve to an injection point, and a second position for passing fluid from the supply line to the second chamber, thereby moving the fluid barrier to displace fluid from the first chamber back through the valve to the injection point, the valve further comprising a variable valve opening for controlling flow between the supply line and the metering body;
    a position sensor for sensing position of the fluid barrier within the metering body; and
    a control system in communication with the position sensor and including a timer for timing displacement of the fluid barrier to selected positions, the control system for selectively adjusting the variable valve opening in response to displacement time of the fluid barrier and for selectively reversing the position of the multi-position valve in response to position of the fluid barrier.

2. A system as defined in claim 1, wherein the metering body comprises a fluid cylinder having a substantially circular bore and the fluid barrier comprises a piston.

3. A system as defined in claim 1, wherein the multi-position valve further comprises:
    a gate valve having a variable position gate for selectively positioning with respect to a flow path.

4. A system as defined in claim 3, further comprising:
    a stepper motor in communication with the control system for driving a ball screw to position the gate with respect to the flow path.

5. A system as defined in claim 1, wherein the position sensor comprises:
    a proximity sensor for sensing that the fluid barrier has reached one or more of the selected positions.

6. A system as defined in claim 1, wherein the selected positions of the fluid barrier include opposing ends of the metering body.

7. A system as defined in claim 6, wherein the position sensor comprises:
    a pressure sensor for sensing a pressure reduction in fluid flowing from the metering body corresponding to displacement of the fluid barrier to the opposing ends of the metering body.

8. A system as defined in claim 1, further comprising:
    the control system selectively increasing the valve opening to a substantially fully-open cleaning position.

9. A system as defined in claim 8, wherein the control system opens the valve to the cleaning position as a function of a preselected number of displacement cycles.

10. A system as defined in claim 8, wherein the control system opens the valve to the cleaning position in response to increasing time intervals corresponding to a decreasing flow rate.

11. A system as defined in claim 8, further comprising:
    a valve pressure sensor for sensing a reduced flow rate through the valve opening, in response to which the control system opens the valve to the cleaning position.

12. A system as defined in claim 8, wherein the control system decreases the valve opening temporarily to reduce the flow rate, to compensate for an increased flow rate when at the cleaning position.

13. A system as defined in claim 1, wherein the control system selectively pauses prior to reversing the position of the multi-position valve, to decrease the average flow rate from the metering body to the injection point.

14. A fluid injection system for controlling the distribution of fluid from a supply line to a selected well at an adjustable rate, comprising:
    a fluid cylinder having a substantially circular bore for containing fluid;
    a piston segregating the bore of the fluid cylinder into variable-volume first and second chambers, the piston movable in response to a pressure difference between the first and second chambers;
    a first input-output port for passing fluid into and out of the first chamber, and a second input-output port for passing fluid into and out of the second chamber;
    a multi-position gate-type valve comprising a variable position gate movable with respect to a valve opening for selectively adjusting flow rate between the supply line and the fluid cylinder, the multi-position valve further comprising a first position for passing fluid from the supply line into the first chamber, thereby moving the piston to displace fluid from the second chamber back through the valve to an injection point, and a second position for passing fluid from the supply line to the second chamber, thereby moving the piston to displace fluid from the first chamber back through the valve to the injection point;
    a position sensor for sensing position of the piston within the fluid cylinder, the position sensor comprising a proximity sensor for sensing that the piston has reached selected positions including opposing ends of the fluid cylinder; and a control system in communication with the position sensor and including a timer for timing displacement of the piston to selected positions, the control system for selectively adjusting the position of the gate in response to displacement time of the piston, for selectively reversing the position of the multi-position valve in response to position of the piston, and for selectively moving the gate to a substantially fully-open cleaning position.

15. A system as defined in claim 14, further comprising:
a stepper motor in communication with the control system for driving a ball screw to position the gate with respect to the flow path.

16. A system as defined in claim 14, wherein the position sensor comprises:
a pressure sensor for sensing a pressure reduction in fluid flowing from the fluid cylinder corresponding to displacement of the piston to either of the opposing ends of the fluid cylinder.

17. A system as defined in claim 14, wherein the control system moves the gate to the cleaning position as a function of a preselected number of displacement cycles.

18. A system as defined in claim 14, wherein the control system moves the gate to the cleaning position in response to increasing time intervals corresponding to a decreasing flow rate.

19. A system as defined in claim 14, further comprising:
a valve pressure sensor for sensing a reduced flow rate through the valve opening, in response to which the control system moves the gate to the cleaning position.

20. A method of controlling the distribution of fluid from a supply line to a selected well at an adjustable rate, comprising:
providing a metering body having a bore for containing fluid;
providing a fluid barrier segregating the bore into variable-volume first and second chambers, the fluid barrier movable in response to a pressure difference between the first and second chambers, a first input-output port for passing fluid into and out of the first chamber, and a second input-output port for passing fluid into and out of the second chamber;
providing a multi-position valve comprising a first position for passing fluid from the supply line into the first chamber, thereby moving the fluid barrier to displace fluid from the second chamber back through the valve to an injection point, and a second position for passing fluid from the supply line to the second chamber, thereby moving the fluid barrier to displace fluid from the first chamber back through the valve to the injection point, the valve further comprising a variable valve opening for controlling flow between the supply line and the metering body;
providing a position sensor for sensing position of the fluid barrier within the metering body;

timing displacement of the fluid barrier to selected positions;
selectively adjusting the variable valve opening in response to displacement time of the fluid barrier; and
selectively reversing the position of the multi-position valve in response to position of the fluid barrier.

21. A method as defined in claim 20, wherein the metering body comprises a fluid cylinder having a substantially circular bore and the fluid barrier comprises a piston.

22. A method as defined in claim 20, further comprising:
the multi-position valve including a gate valve having a variable position gate; and
selectively positioning the gate with respect to a flow path.

23. A method as defined in claim 22, further comprising:
providing a stepper motor and a ball screw connected with the gate; and
positioning the gate with respect to the flow path.

24. A method as defined in claim 20, wherein the position sensor comprises:
a proximity sensor for sensing that the fluid barrier has reached one or more selected positions.

25. A method as defined in claim 20, wherein the selected positions of the fluid barrier include opposing ends of the metering body.

26. A method as defined in claim 25, wherein the position sensor comprises:
a pressure sensor for sensing a pressure reduction in fluid flowing from the metering body corresponding to displacement of the fluid barrier to the opposing ends of the metering body.

27. A method as defined in claim 20, further comprising:
selectively increasing the valve opening to a substantially fully-open cleaning position.

28. A method as defined in claim 20, further comprising:
opening the valve to the cleaning position as a function of a preselected number of displacement cycles.

29. A method as defined in claim 27, further comprising:
opening the valve to the cleaning position in response to increasing time intervals corresponding to a decreasing flow rate.

30. A method as defined in claim 27, further comprising:
providing a valve pressure sensor for sensing a reduced flow rate through the valve opening; and
opening the valve to the cleaning position in response to the reduced flow rate.

31. A method as defined in claim 27, further comprising:
decreasing the valve opening temporarily to reduce the flow rate, to
compensate for an increased flow rate when at the cleaning position.

32. A method as defined in claim 20, further comprising:
selectively pausing prior to reversing the position of the multi-position valve, to decrease the average flow rate from the metering body to the injection point.

* * * * *